United States Patent
Givot et al.

(10) Patent No.: US 10,303,530 B1
(45) Date of Patent: May 28, 2019

(54) SYSTEM AND METHOD FOR SEQUENTIALLY INTERLEAVING UNDELAYED AND INTENTIONALLY DELAYED EXECUTABLE INSTRUCTIONS

(71) Applicant: Chicago Stock Exchange, Inc., Chicago, IL (US)

(72) Inventors: Steven I. Givot, Chicago, IL (US); John K. Kerin, Park Ridge, IL (US)

(73) Assignee: Chicago Stock Exchange, Inc., Chicago, IL (US)

( * ) Notice: Subject to any disclaimer, the term of this patent is extended or adjusted under 35 U.S.C. 154(b) by 0 days.

(21) Appl. No.: 15/644,306

(22) Filed: Jul. 7, 2017

Related U.S. Application Data

(63) Continuation-in-part of application No. 15/181,681, filed on Jun. 14, 2016.

(51) Int. Cl.
  *G06F 9/54* (2006.01)
  *G06Q 40/04* (2012.01)
  *G06F 9/30* (2018.01)

(52) U.S. Cl.
  CPC ............ *G06F 9/546* (2013.01); *G06Q 40/04* (2013.01); *G06F 9/30079* (2013.01)

(58) Field of Classification Search
  CPC ............ G06F 9/54; G06F 9/542; G06F 9/546
  See application file for complete search history.

(56) References Cited

U.S. PATENT DOCUMENTS

| | | | |
|---|---|---|---|
| 5,701,516 A * | 12/1997 | Cheng ................. | G06F 12/0804 710/22 |
| 5,951,644 A * | 9/1999 | Creemer ............... | H04L 41/147 370/229 |
| 8,165,954 B2 | 4/2012 | Waelbroeck et al. | |
| 2006/0090103 A1 * | 4/2006 | Armstrong ............. | G06F 9/546 714/100 |
| 2015/0066727 A1 | 3/2015 | Wepsic et al. | |
| 2015/0356679 A1 | 12/2015 | Schmitt | |

OTHER PUBLICATIONS

"U.S. Appl. No. 15/181,681 Examiner Interview Summary dated Nov. 14, 2016", 3 pgs.
"U.S. Appl. No. 15/181,681, Final Office Action dated Jan. 31, 2017", 20 pgs.
"U.S. Appl. No. 15/181,681, Non Final Office Action dated Sep. 22, 2016", 14 pgs.
"U.S. Appl. No. 15/181,681, Response filed Dec. 21, 2016 to Non Final Office Action dated Sep. 22, 2016", 21 pgs.

* cited by examiner

*Primary Examiner* — Umut Onat
(74) *Attorney, Agent, or Firm* — DLA Piper LLP (US)

(57) ABSTRACT

A system and related method are provided for interleaving undelayed and intentionally delayed executable instructions that are executable by a processor of a system having a memory. The method comprises utilizing the processor to execute programmed instructions for: receiving, by a message handling process (MHPa), a triggering signal triggering the MHPa to an active state. In response to the MHPa being triggered to the active state, the MHPa determines if a delayed message queue (DMQa) is empty. When the DMQa is empty, the system determines if an immediate message queue is empty. When not, a current message is set to be a top message in the IMQa. When the delay criteria of the current message do not require an intentional delay, the system executes the executable instructions of the current message, and when they do, the message is placed in the DMQa.

23 Claims, 10 Drawing Sheets

SYSTEM AND METHOD FOR SEQUENTIALLY INTERLEAVING UNDELAYED AND INTENTIONALLY DELAYED EXECUTABLE INSTRUCTIONS

CROSS REFERENCE TO RELATED APPLICATIONS

The present application is a continuation-in-part of U.S. patent application Ser. No. 15/181,681, filed Jan. 30, 2014, entitled, "SYSTEM AND METHOD FOR DELAYING AN EXECUTABLE INSTRUCTION THAT WOULD OTHERWISE BE EXECUTABLE IMMEDIATELY UPON ARRIVAL AT AN EXECUTING SYSTEM". ("the '681 application") herein incorporated by reference.

BACKGROUND

The system and method described below relate, in general, to the interleaving of undelayed and intentionally delayed executable instructions, such as instructions described in the '681 application. The instructions may be contained within Messages that are communicated within and across systems for executing them, and use of the terms "instructions" and "Messages" may be used interchangeably below to refer to messages and the instructions they, contain. When the system contains multiple queues or buffers to, e.g., improve performance, it is important that the instructions are executed in a proper sequence.

The systems and methods described herein are applicable to any technical system utilizing undelayed and intentionally delayed executable instructions in conjunction with multiple buffers. One implementation of this technical system is in the field of automated trading, and although use in this field is described in detail below the technical application is not limited to this implementation, and the invention as a whole should be construed broadly and as a technical solution to a technical problem involving multiple buffers and sequencing of executable instructions.

In the past two decades, there has been extraordinary evolution in the automated handling of orders to buy and sell financial instruments including, but not limited to, equity securities, options, government debt securities, corporate debt securities, foreign exchange (currency), futures contracts, and options on futures contracts.

This evolution has typically resulted in manual trading being replaced by automated trading. However, by introducing automated trading into the field, new capabilities are provided that were simply not possible with manual trading. These capabilities include, but are not limited to, matching of buyers and sellers employing sophisticated order types and the use of fully automated Matching Systems to manage the execution priority of these orders, the limitations and restrictions of the terms of each order, and the actual matching of each buyer with each seller based on rules or algorithms which are particular to the regulatory framework in which the Matching System operator works and the rules of the Matching System operator.

As the matching of buyers and sellers became more automated, traditional Liquidity Providers (specialists, market makers, floor traders, OTC traders, etc.) have given way to automated Liquidity Providers who employ electronic systems to place orders to buy and sell securities. Collectively, today's markets rely largely on automated Liquidity Providers to be present to take the other side of a trade when a competitive buyer or seller enters the market.

Because of intense competition among trading venues, almost any financial instrument that is traded on an electronic Matching System is either traded in multiple trading venues and/or has a derivative relationship with another financial instrument that is electronically traded somewhere. For this reason, the pricing of almost any financial instrument will vary as the price of the same or a related financial instrument changes in some trading venue.

These interrelationships have led to a "speed war" which is fought among market participants. In some instances, a market participant is trying to be the first to recognize the change in the price of a financial instrument in one trading venue and execute a trade in the same financial instrument in another trading venue. In other instances, a market participant is trying to be the first to recognize the change in the price of a financial instrument in one trading venue and execute a trade in the same financial instrument or a related financial instrument in the same or a different trading venue.

These efforts—based on having a speed advantage in detecting and responding to changes in the price and size of quotations in a security—are part of a "latency arbitrage" strategy. Latency arbitrage can be described as the practice of exploiting disparities in the pricing of the same financial instrument or related financial instruments that are being traded in the same or different markets by taking advantage of the time it takes to access and respond to market information. For the purpose of this application, a "latency arbitrageur" is defined as a Liquidity Taker who employs a successful latency arbitrage strategy by shooting orders to Take Liquidity, from a contra party victim that has been unable to access and respond to the same market information fast enough to modify the price and/or size of the liquidity that the victim is providing.

One consequence of a successful latency arbitrage strategy is that the latency arbitrageur extracts an economic rent from the Liquidity Provider who, although highly automated, does not respond to the same changes in market information as quickly as the latency arbitrageur.

To avoid paying this economic rent to the latency arbitrageur, some Liquidity Providers respond by attempting to beat the latency arbitrageur in the "speed war." However, this can be very costly, and even after committing significant resources to be faster, the Liquidity Provider may not succeed or may succeed for only a period of time after which the latency arbitrageur invests further and becomes faster yet again.

Other responses of the victim Liquidity Provider can range from providing liquidity at less competitive prices, providing less size at the same price, or—in the extreme—ceasing to act as a Liquidity Provider in an attacked financial instrument altogether. The impact of any of these responses is an undesirable reduction of liquidity in the marketplace.

Liquidity Providers are increasingly finding themselves under such latency arbitrageur attacks. The cost of doing nothing requires the Liquidity Provider to do something. The net impact of the range of responses taken has been an overall reduction in liquidity.

The "speed war" has resulted in various changes which seek to deemphasize the importance of speed in getting a Message containing one or more executable instructions to a Trading Center. Some of these changes involve Trading Centers which intentionally delay execution of Messages containing certain instructions based on a set of Delay Criteria. When intentionally delays are imposed, the length of the delay can be fixed (potentially based on the Delay Criteria which are met), randomized (within a range of delay times potentially based on the Delay Criteria which are met) or a combination of both fixed and randomized delay periods.

Intentional delays, as described herein, require an automated system and method for implementation because the length of an intentional delay is always less than one second and typically less than one millisecond—a period so short that the message handling can only be implemented by an automated system.

SUMMARY

The systems and methods described herein provide for processing Messages in a manner which assures proper interleaving. This interleaving ensures that the Messages, after any intentional delays have been accomplished, result in instructions contained in those Messages being processed in the same sequence as the original order of receipt of those Messages. The interleaving of the Messages is handled by a processor in a technical system and respective memory-based queues utilized therein. Specifically, the system and method described below relate to a system and method applied to a processor which, based on a set of Delay Criteria, evaluates Messages upon initial receipt and determines whether the instruction(s) contained in each Message should be executed immediately or subject to an intentional delay before the instructions contained in the Message are eligible for immediate execution.

An implementation of such a system and method, although the invention is not so limited to such an implementation, may be applied to a marketplace for the automated (electronic) trading of financial instruments and, more particularly, to a system and method of delaying the matching of orders to buy or sell products, for example, financial instruments, in a Matching System. However, this system and method can apply broadly. For example, they might apply to a weapon whose output could be canceled after a fire command but prior to execution of the command, or to an automated system for operating a vehicle allowing for a brief period of time to confirm whether to take extreme action in braking, accelerating, or steering the vehicle in response to a perceived hazard.

Described herein is an automated system and method which operates within a system which receives Messages containing one or more executable instructions. The automated system and method determines which executable instructions contained within those Messages will be executed immediately (without an intentional delay) and which executable instructions which would otherwise be executable immediately upon receipt will be intentionally delayed. As described above, such a delay could, for example, provide an opportunity to cancel execution of the instruction if additional subsequently-received information might suggest that the executable instruction should not be executed. Whether the instructions contained in a Message are eligible for immediate execution or intentionally delayed may be determined by a set of Delay Criteria which are established to achieve a particular objective in the context to which this system and method are applied. Although various implementations of Delay Criteria may be illustrated below, the invention is not so limited and the invention may utilize any set of Delay Criteria.

In a specific application of such a system, according to an implementation, the automated system and method apply to a financial instrument Matching System which would impose a delay on matching any new order which would Take Liquidity immediately upon receipt by the Matching System. Since all latency arbitrageur attacks Take Liquidity from orders already in a Matching System (i.e., "resting orders"), the proposed delay may provide a short window of opportunity for a resting order which is providing liquidity to be cancelled in response to changes in market information. The Delay Criteria for various implementations discussed herein could specify that Messages containing an order which would immediately Take Liquidity in the Matching System would be subject to a brief intentional delay. This delay may typically be a small fraction of one second—far too short to permit implementation without a fully automated system and method.

In another specific application of such a system, according to an implementation, the automated system and method apply to a financial instrument Matching System which would impose a delay on matching any new order which would Take Liquidity immediately upon receipt by the Matching System and would also limit impose a delay on cancelling orders except for orders presented by registered Liquidity Providers who were obligated to meet certain high performance standards in return for the ability to cancel resting orders without an intentional delay.

DEFINITIONS & ACRONYMS

State of the art Matching Systems can be single-threaded or multi-threaded. A single-threaded Matching System can only process one Message at a time. A multi-threaded Matching System can process multiple Messages simultaneously. However, because all Messages for a given financial instrument must be processed in sequence, at any point in time, all Messages related to a given financial instrument are preferably sent to the same Matching Thread. In a multi-threaded Matching System, the Matching Thread assigned to matching a given financial instrument may change over time to dynamically balance the demand for Matching Thread resources.

To simplify the description below, definitions, examples, and descriptions that assume implementation in a multi-threaded Matching System will have elements associated with a specific thread denoted by an acronym ending in a single, lower case letter. For example, MHPa, IMQa, DMQa, MR2a, MR3a, MR4a, MR5a, SIG1a, SIG2a, and SIG3a (defined below) are all associated with Matching Thread a; MHPb, IMQb, DMQb, MR2b, MR3b, MR4b, MR5b, SIG1b, SIG2b, and SIG3b are all associated with Matching Thread b; and so on.

Although shown and discussed in the context of a multi-threaded Matching System, the system and method are equally applicable to a single-threaded Matching System. In such a system, only MHPa, IMQa, DMQa, MR2a, MR3a, MR4a, MR5a, SIG1a, SIG2a, and SIG3a exist.

Accordingly, a method for interleaving undelayed and intentionally delayed executable instructions that are executable by a processor of a system having a memory. The method comprises utilizing the processor to execute programmed instructions for: receiving, by a message handling process, a triggering signal triggering the MHPa to an active state; in response to the MHPa being triggered to the active state, performing, by the MHPa: determining if a delayed message queue is empty; when the DMQa is empty, determining if an immediate message queue is empty, and when not, then: setting a current message to be a top message in the IMQa; determining if delay criteria of the current message requires an intentional delay of the current message;

and when the delay criteria do not require an intentional delay, executing the executable instructions of the current message.

A system is provided for interleaving undelayed and intentionally delayed executable instructions, comprising: a processor configured to execute the executable instructions; a memory; a message handler that executes using the processor and that is triggered by a triggering signal to an active state; a delayed message queue located within the memory; an immediate message queue located within the memory; wherein the MHPa is configured to, when in the active state: determine if the delayed message queue is empty; when the DMQa is empty, determine if the immediate message queue is empty, and when not, then: set a current message to be a top message in the IMQa; determine if delay criteria of the current message requires an intentional delay of the current message; when the delay criteria do not require an intentional delay, execute the executable instructions of the current message.

The systems and methods are described below for assuring that Messages held in a Delayed Message Queue are properly interleaved with Messages which may be held in the corresponding Immediate Message Queue. This is described as Intended Interleaving Behavior.

The following definitions and acronyms are utilized in the following description.

TABLE 1

| | Definitions |
|---|---|
| Delayed Message Queue (DMQ_) | A Message queue in which intentionally delayed Messages are stored in the sequence in which they become eligible for release for immediate execution. A multi-threaded Matching System may have one or more Message Handling Processes (MHP_). For each Message Handling Processes (MHP_), there may be a Delayed Message Queue (DMQ_) associated with the MHP, Message Routes (MR3_, MR4_, and MR5_), and Signals (SIG1_, SIG2_, and SIG3_), |
| Delayed Message Release Process (DMRP) | A process which may (1) receive and store information related to all intentionally delayed Messages, (2) detect when an intentionally delayed Message - held in a Delayed Message Queue (DMQ_) - is eligible to be released for immediate execution, and (3) signal a Message Handling Process (MHP_) using a Signal (SIG3_) when a Message is eligible to be released of immediate execution. In one implementation, there is a single DMRP that may execute on a single core and that may execute in a tight loop as long as a message exists in any DMQ. |
| Dispatcher Process (DP) | A process which may initially receive all inbound Messages from the Inbound Message Queue (INQ) in a FIFO order in which they were placed into the INQ. The Dispatcher Process (DP) may provide a timestamp (Time of Receipt) and Sequence Number for each Message taken from the Inbound Message Queue (INQ). A state of the art DP may determine which Matching Thread will process each inbound Message, place the inbound Message into the Immediate Message Queue (IMQ_) corresponding to that Matching Thread (MHP_), and signal the MHP_ that a Message is available for processing. |
| Delay Criteria | A set of criteria that may be used to determine whether an executable instruction contained within a Message should be processed immediately or intentionally delayed. The Delay Criteria may also determine the length of any intentional delay. |
| Electronic Communication Network (ECN) | A type of trading venue which includes a network for receiving Messages and a Matching System for handling those Messages including the matching of Orders. |
| FIFO Queue | A Message queue which is maintained as a first in-first out queue. |
| Immediate Message Queue (IMQ_) | A FIFO queue of Messages being sent to a Message Handling Process (MHP_) by the Dispatcher Process (DP). In a Matching System, there is preferably one Immediate Message Queue (IMQ_) corresponding to each MHP_. |
| Inbound Message Queue (INQ) | A FIFO queue of Messages being sent to the Matching System from outside the Matching System. The INQ may be a formal FIFO queue or may be implemented through messaging technology (i.e., network technology) which performs the queuing process outside of the Matching System such that Messages arrive and are queued through that technology. |
| Intended interleaving Behavior | This system and method are designed to produce a specific intended behavior for interleaving delayed Messages whose Intentional Delay Period has lapsed with Messages which are not subject to an intentional delay. The need for such a behavior arises because the time required for a Message Handling Process (MHP_) is not zero. As a result, it is possible that the Immediate Message Queue (IMQ_) associated with a Message Handling Process (MHP_) can develop a significant backlog of Messages while an intentionally delayed order is waiting in the Delayed |

TABLE 1-continued

| | Definitions |
|---|---|
| | Message Queue (DMQ_) for its Intentional Delay Period to lapse. When this occurs, it is necessary to define the sequence in which Messages in IMQ_ and releasable Messages in DMQ_ are processed. This system and method define that sequence. When a Message Handling Process (MHP_) is available to process a new Message, it inspects the corresponding Immediate Message Queue (IMQ_) and the corresponding Delayed Message Queue (DMQ_) all of which are associated with the same Matching Thread.<br>If IMQ_ and DMQ_ are both empty, there are no Messages to process and MHP_ enters a Wait State which ends when MHP_ receives either of two Signals - SIG 1_ or SIG 3_.<br>If there is at least one Message in IMQ_ and DMQ_ is empty, then MHP_ removes the top Message from IMQ_ and performs Message Evaluation to determine how to proceed.<br>If IMQ_ is empty and there is at least one Message in DMQ_, then<br>If the Release Time of the top Message in DMQ_ has been reached, then MHP_ removes the top Message from DMQ_ and immediately executes the instructions contained in the Message.<br>If the Release Time of the top Message in DMQ_ has not been reached, then MHP_ enters a Wait State which ends when MHP_ receives either of two Signals - SIG 1_ or SIG 3_.<br>If there are Messages in both IMQ_ and DMQ_, then<br>If the Release Time of the top Message in DMQ_ has not been reached, MHP_ removes the top Message from IMQ_ and performs Message Evaluation to determine how to proceed.<br>Otherwise, the Release Time of the top Message in DMQ_ has been reached, and<br>If the Time of Receipt of the top Message in IMQ_ is less than the Release Time of the top message in DMQ_, then MHP_ removes the top Message from IMQ_ and performs Message Evaluation to determine how to proceed.<br>Otherwise, the Time of Receipt of the top Message in IMQ_ is greater than or equal to the Release Time of the top message in DMQ_, and MHP_ removes the top Message from DMQ_ and immediately executes the instructions contained in that Message. |
| Intentional Delay Period | The time between the Time of Receipt given to each inbound Message by the Dispatcher Process (DP) and the time when that Message is eligible to be removed from the Delayed Message Queue (DMQ_) for immediate processing. Only Messages which are subject to an intentional delay based on the Delay Criteria have an Intentional Delay Period. |
| Liquidity Provider | A party to a trade who Makes Liquidity or Provides Liquidity. |
| Liquidity Taker | A party to a trade who Takes Liquidity. |
| Matching Handling Process (MHP_) | A system which accepts and processes executable instructions. Each Matching Engine may have one or more Message Handling Processes (MHP_) - one for each Matching Thread.<br>A Message Handling Process (MHP_), according to an implementation described herein, performs Message Evaluation.<br>If Message Evaluation determines that the Message is to be executed immediately, it is.<br>Otherwise, the Message is to be intentionally delayed, and MHP_<br>   Determines the Intentional Delay Period<br>   Calculates the Release Time for the as the sum of the Time of Receipt and the Intentional Delay Period<br>   Inserts the Message into the corresponding DMQ_ based on its Release Time such that the Message with the soonest Release Time is at the top of DMQ and all Messages are sequenced in DMQ_ based on ascending Release Times. |

TABLE 1-continued

Definitions

| | |
|---|---|
| Matching System | A trading facility through which buy and sell orders in one or more securities are matched. |
| Matching Thread | That portion of a Matching System which maintains Resting Orders in a Resting Order Book and processes instructions contained within inbound Messages against the Resting Order Book when those instructions are ready for immediate execution. As used herein, a Matching Thread is a Message Handling Process (MHP_). |
| Message Evaluation | The sequence of steps performed by MHP_. During Message Evaluation, a Message removed from the corresponding Immediate Message Queue (IMQ_) and Delay Criteria may be used to determine whether the Message should be executed immediately or placed in the Delayed Message Queue (DMQ_). |
| Messages | Messages sent to the Matching System which, in the case of trading of financial instruments, could include Orders, Cancel Requests, Cancel/Replace Requests, and other Messages which may be accepted but are not treated differently because of implementing this system and method. |
| Message Route (MR1_, MR2_, MR3_, MR4_, MR5_) | Message Routes depict the flow of Messages between processes and queues.<br>MR1_ is the path from the Inbound Message Queue (INQ) to the Dispatcher Process (DP).<br>MR2_ is the path from DP to the Immediate Message Queue (IMQ_),<br>MR3_ is the path from IMQ_ to the Message Handling Process (MHP_).<br>MR4_ is the path from MHP_ to the Delayed Message Queue (DMQ_).<br>MR5_ is the path from the DMQ_ to MHP_. |
| Order | An instruction to enter a new order to buy or sell a financial instrument. |
| Release Time | The time at which a Message residing in a Delayed Message Queue (DMQ_) is eligible for immediate execution by the corresponding Message Handling Process (MHP_). Release Time is calculated as the sum of the Time of Receipt of a Message plus the Intentional Delay Period for that Message. When the MHP_ is available to handle a new Message, it checks both the corresponding IMQ_ and the corresponding DMQ_ to determine which, if any, Message to handle next. The top Message in DMQ_ is eligible for immediate execution only if the current time is greater than or equal to the Release Time of that intentionally delayed Message. |
| Resting Order | An unmatched Order in the Resting Order Book which is available for immediate matching by the Matching System. |
| Resting Order Book | The collection of all Resting Orders. |
| Sequence Number | A number assigned by the Dispatcher Process to each Message received from the Inbound Message Queue (INQ) at the time it is first removed from that queue. Sequence Numbers are assigned in ascending order with an increment of one. |
| Signals (SIG1_, SIG2_, SIG3_) | Signals are used by one process to inform another process that a Message has been placed in a queue. If the process receiving a Signal is in a Wait State, the Signal causes that process to become active and perform whatever work is required to be performed when the Signal arrives.<br>SIG1_ is sent by the Dispatcher Process (DP) to the Message Handling Process (MHP_) to inform MHP_ that a new Message has been placed in the Immediate Message Queue (IMQ_).<br>SIG2_ is sent by the Message Handling Process (MHP_) to inform the Delayed Message Release Process (DMRP) that a new Message has been placed in the Delayed Message Queue (DMQ_).<br>SIG3_ is sent by the Delayed Message Release Process (DMRP) to inform the Message Handling Process (MHP_) that a Message in the Delayed Message Queue (DMQ_) has reached its Release Time.<br>As defined herein, the term "Signal" includes a Signal, a semaphore, or any other mechanism which permits one process to information another process of an event.<br>In other implementations of this system and method, Signals can be replaced by a tight programmed loop which repeatedly polls to determine whether an event has occurred. (See definition of Wait State.) |

TABLE 1-continued

Definitions

| | |
|---|---|
| Take Liquidity | A new inbound Order which is matched against a Resting Order in the Resting Order Book as part of a trade is said to Take Liquidity. |
| Trading Center | A party which operates a Matching System. |
| Time of Receipt | A timestamp assigned by the Dispatcher Process (DP) to each Message received from the Inbound Message Queue (INQ) at the time it is first removed from that queue. Time of Receipt is recorded to the greatest degree of granularity supported by the processor on which the system and method are implemented. |
| Wait State | As relates to this invention, the Wait State of a process can be implemented in various ways including:<br>Method 1: the process can relinquish control to the operating system which will utilize a Signal to awaken the process when an event occurs (e.g., arrival of a new Message).<br>Method 2: the process can remain in a tight loop, constantly polling to determine whether there is work to be done (e.g., arrival of a new Message). |

DESCRIPTION OF THE DRAWINGS

For a more complete understanding of the system and method described herein, and for further features and advantages, reference is now made to the following descriptions, taken in conjunction with the accompanying drawings which include.

All drawings have been simplified by omitting various activities. One such activity is the actual execution of instructions found in a Message which takes place in a Message Handling Process (MHP_). A second such activity is logging various activities to a file or database to support auditing the processes for proper performance as well as for recovery in the event of a system failure. A third such activity is translating Messages from one format to another. A fourth such activity is validating the format and content of a Message. The currently defined Message Handling Process (MHP_) may employ any or all of these activities or other activities for such a process or system that supports these activities.

DETAILED DESCRIPTION

Figure 1:
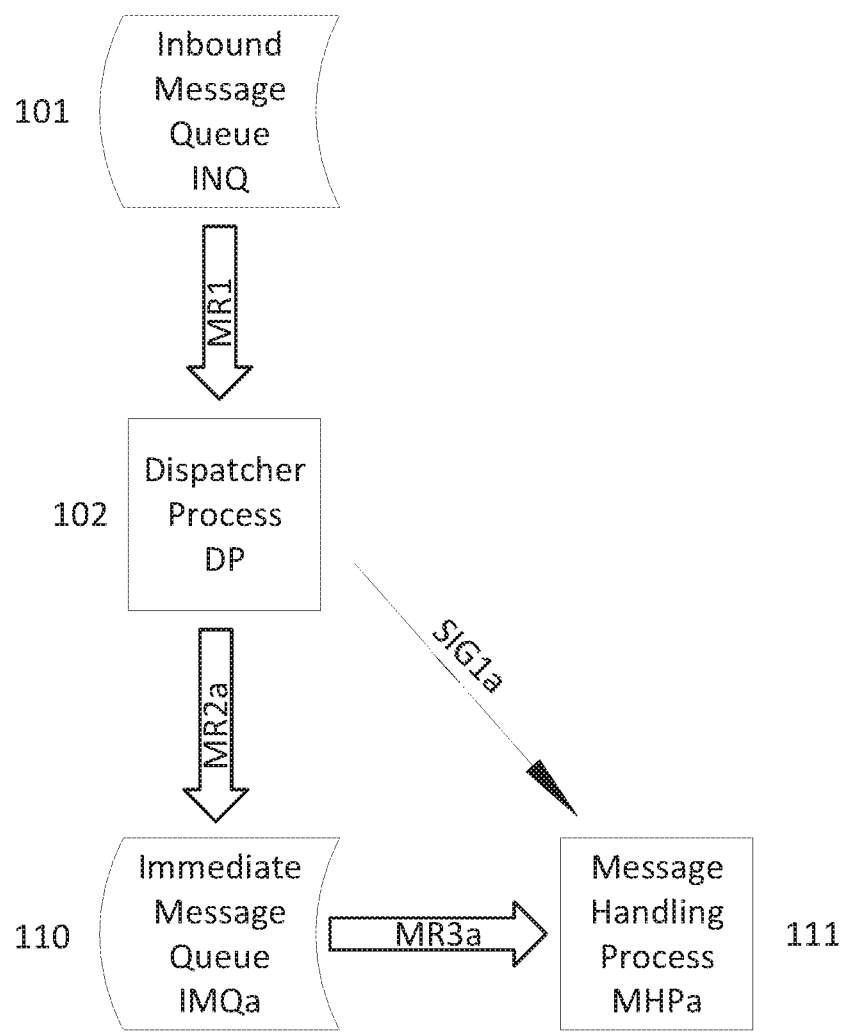
FIG. 1 is a block flow diagram that illustrates a state-the-art system with a single Message Handling Process (MHPa) in which a Message flows from the Inbound Message Queue (INQ) to the Dispatcher Process (DP) using Message Route MR1a, then flows into the Immediate Message Queue (IMQa) using Message Route MR2a. DP uses Signal SIG1a to inform the Message Handling Process (MHPa) that a Message is ready to be processed. MHPa removes the Message from IMQa using patch Message Route MR3a and the Message is immediately executed. This is a special case of FIG. 2 where there is only one Matching Thread.

FIG. 1 is a block flow diagram that illustrates operation of a state-of-the-art Dispatch Process (DP) which receives Inbound Messages and sequences their arrival in the Message Handling Process (MHPa). Because there is only one Message Handling Process, this is a single-threaded system.

Messages from all sources directed to the system are queued in a FIFO Inbound Message Queue (INQ) 101.

Messages in the FIFO Inbound Message Queue (INQ) 101 are sent using path message route MR1 to the Dispatcher Process (DP) 102. The Dispatcher Process (DP) 102 performs any required preprocessing such as establishing Time of Receipt, assigning Sequence Numbers, or Message logging. The Dispatcher Process (DP) 102 then places the Message into the FIFO Immediate Message Queue (IMQa) 110 using path MR2. Then the Dispatcher Process (DP) 102 sends a Signal (SIG1a) to the Message Handling Process (MHPa) 111 to inform MHPa that there is a Message in IMQa.

The Message resides in the FIFO Immediate Message Queue (IMQa) 110 until removed by the Message Handling Process (MHPa) 111.

The Message Handling Process (MHPa) 111 is either in a Wait State or actively, processing a Message. If MHPa 111 is in a Wait State, MHPa 111 remains in a Wait State until it receives a Signal SIG1a which indicates that a Message is in the Immediate Message Queue (IMQa) 110 ready to be processed. At that time, MHPa 111 removes the top (top is synonymous with first) Message from the IMQa 110 using path MR3a. MHPa then executes the instruction contained in the Message. Each time MHPa 111 completes execution of an instruction contained in a Message it checks IMQa 110 to determine whether there is a Message in that queue. If so, then MHPa 111 removes the top Message from IMQa 110 using path MR3a. MHPa 111 then executes the instruction contained in the Message. If not, MHPa 111 enters a Wait State until it receives a Signal SIG1a indicating that there is a Message waiting for it to process in IMQa 110.

Figure 2:
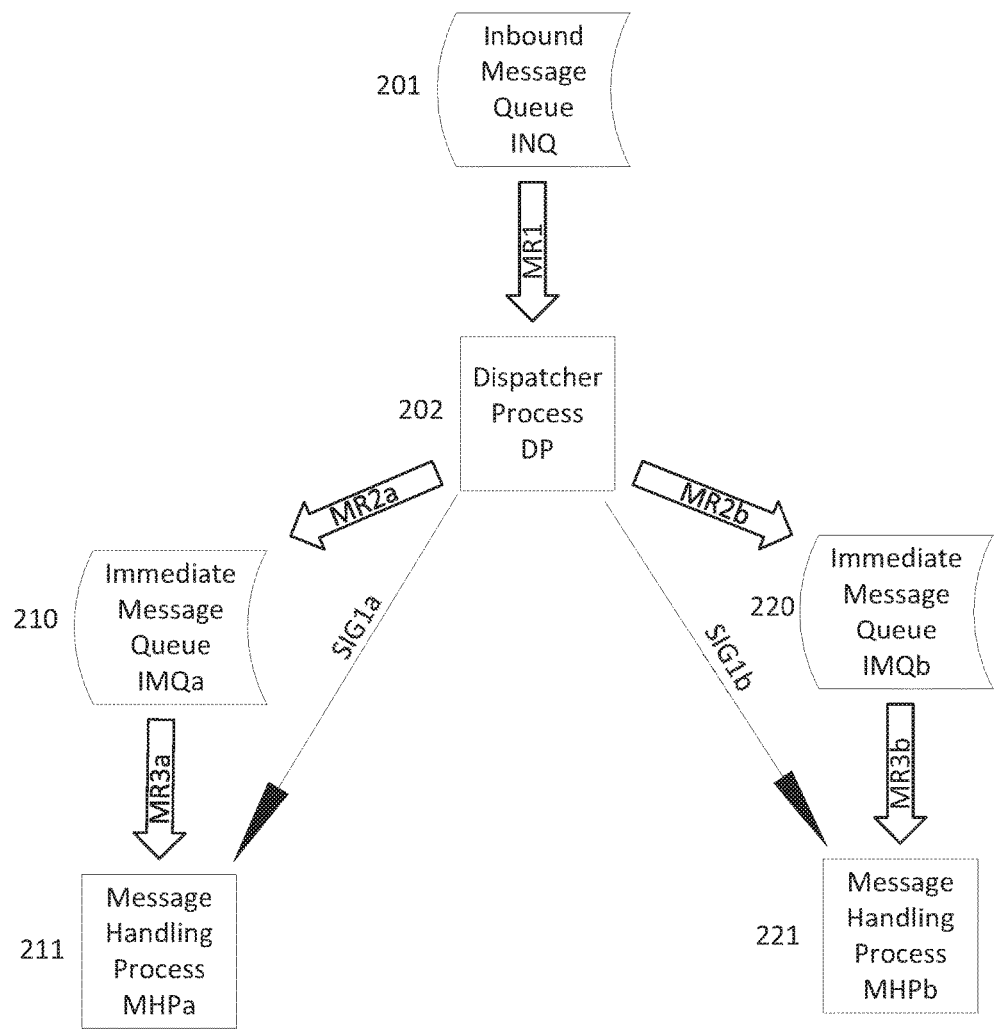
FIG. 2 is a block flow diagram that illustrates a state-of-the-art system with two Message Handling Processes (MHPa and MHPb) each of which has an associated Immediate Message Queue (IMQa or IMQb). The flow of Messages is analogous to that in FIG. 1 except that common elements INQ, MR1, and DP support two Matching Threads.

FIG. 2 is a block flow diagram that illustrates operation of a state-of-the-art Dispatch Process (DP) 202 which receives Inbound Messages from the FIFO Inbound Message Queue 201 and sequences their arrival in the Message Handling Processes (MHPa and MHPb) 210 and 220. Because there are two Message Handling Processes, this is a multi-threaded system. Additional MHP_, IMQ_, MR2_, MR3_, and SIG1_ can be added in parallel.

Messages from all sources directed to the system are queued in the FIFO Inbound Message Queue 201.

Messages in the FIFO Inbound Message Queue 201 are sent using path MR1 to the Dispatcher Process (DP) 202. DP 202 performs any required preprocessing such as establishing Time of Receipt, assigning Sequence Numbers, or Message logging. DP 202 then determines which Message Handling Process (MHPa or MHPb) 211 or 221 will handle this Message. If the Message is to be handled by Message Handling Process (MHPa) 211, the DP 202 places the Message into the corresponding FIFO Immediate Message Queue (IMQa) 210 using path MR2a and then sends a Signal (SIG1a) to the Message Handling Process (MHPa) 211. If the Message is to be handled by Message Handling Process (MHPb) 221, the DP 202 places the Message into the corresponding FIFO Immediate Message Queue (IMQb) 220 using path MR2b and then sends a Signal (SIG1b) to the Message Handling Process (MHPb) 221.

The Message resides in the FIFO Immediate Message Queue (IMQa) 210 until removed by the Message Handling Process (MHPa) 211.

The Message Handling Process (MHPa) 211 is either in a Wait State or actively processing a Message. If MHPa 211 is in a Wait State, MHPa 211 remains in a Wait State until it receives a Signal SIG1a which indicates that a Message is in the corresponding Immediate Message Queue (IMQa) 210 ready to be processed. At that time, MHPa 211 removes the top Message from the corresponding IMQa 210 using path MR3a. MHPa 211 then executes the instruction contained in the Message. Each time MHPa 211 completes execution of an instruction contained in a Message it checks the IMQa 210 to determine whether there is a Message in that queue. If so, then MHPa 211 removes the top Message from IMQa 210 using path MR3. MHPa 211 then executes the instruction contained in the Message. If not, MHPa 211 enters a Wait State until it receives a Signal SIG1a indicating that there is a Message waiting for it to process in the IMQa 210.

The Message resides in the FIFO Immediate Message Queue (IMQb) 220 until removed by the Message Handling Process (MHPb) 221.

The Message Handling Process (MHPb) 221 is either in a Wait State or actively, processing a Message. If MHPb 221 is in a Wait State, the MHPb 221 remains in a Wait State until it receives a Signal SIG1b which indicates that a Message is in the corresponding Immediate Message Queue (IMQb) 220 ready to be processed. At that time, MHPb 221 removes the top Message from the corresponding IMQb 220 using path MR3b. MHPb 221 then executes the instruction contained in the Message. Each time MHPb 221 completed execution of an instruction contained in a Message it checks IMQb 220 to determine whether there is a Message in that queue. If so, then MHPb 221 removes the top Message from the Immediate Message Queue (IMQb) 220 using path MR3. MHPb 221 then executes the instruction contained in the Message. If not, MHPb 221 enters a Wait State until it receives a Signal SIG1a indicating that there is a Message waiting for it to process in IMQb 220.

Figure 3:
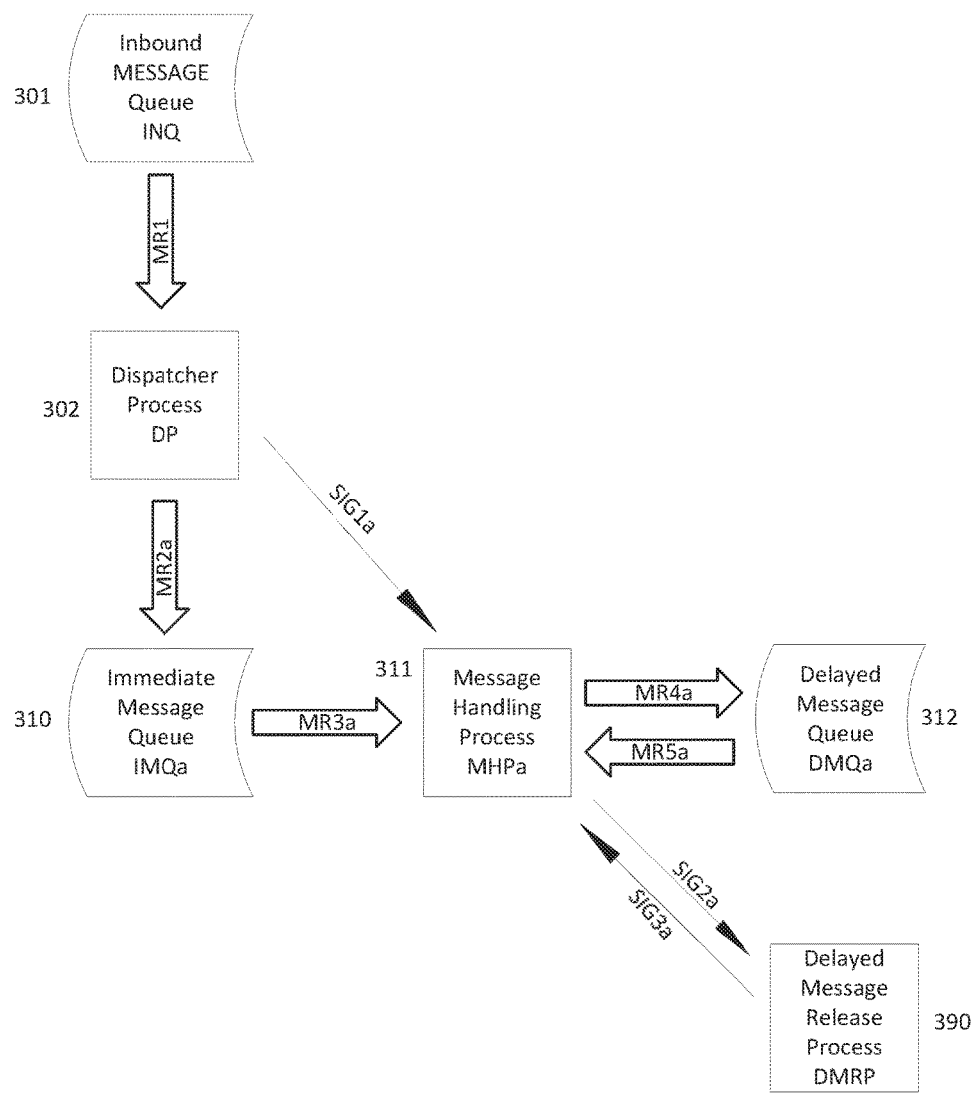
FIG. 3 is a flowchart that illustrates a novel single Message Handling Process (MHPa) similar to that in FIG. 1, but that has been enhanced according to an implementation of the invention which adds a Delayed Message Queue (DMQa) and a Delayed Message Release Process (DMRP) to implement the Intended Interleaving Behavior as well as additional Message Routes (MR4a and MR5a) and Signals (SIG2a and SIG3a). This is a special case of FIG. 4 where there is only one Matching Thread.

FIG. 3 is a block flow diagram that illustrates a novel system with a single Message Handling Process (MHPa) like that in FIG. 1 which has been enhanced according to an implementation of the present invention by adding a Delayed Message Queue (DMQa), a Delayed Message Release Process (DMRP), two Message routes (MR4a and MR5a) and two signals (SIG2a and SIG3a) which may be used to implement the Intended Interleaving Behavior.

Messages from sources directed to the system are queued in the Inbound Message Queue (INQ) 301. The INQ 301 may be configured as a FIFO queue, but may be structured in any form that properly controls the flow of messages.

Messages in the Inbound. Message Queue (INQ) 301 are sent using path MR1 to the Dispatcher Process (DP) 302. DP 302 performs various preprocessing, such as establishing Time of Receipt, assigning Sequence Numbers, or Message logging. DP 302 then places the Message into the Immediate Message Queue (IMQa) 310 using path MR2. Then the Dispatcher Process (DP) 302 sends a Signal (SIG1a) to the Message Handling Process (MHPa) 311.

The Message resides in the Immediate Message Queue (IMQa) 310 until removed by, the Message Handling Process (MHPa) 311. The Message Handling Process (MHPa) 311 is either in a Wait State or actively processing a Message. If the Message Handling Process (MHPa) 311 is in a Wait State, MHPa 311 remains in a Wait State until it: a) receives a Signal SIG1a which indicates that a Message in the Immediate Message Queue (IMQa) 310 is ready to be processed, or b) receives a Signal SIG3 which indicates that a Message in the Delayed Message Queue (DMQa) 312 is ready to be processed. At that time, MHPa 311 may apply the logic illustrated in FIGS. 5A-E (discussed below) to determine what to do next. If the Message Handling Process (MHPa) 311 is actively processing a Message, when it completes processing that Message, MHPa 311 may apply the logic illustrated in FIGS. 5A-E to determine what to do next.

Figure 6A:
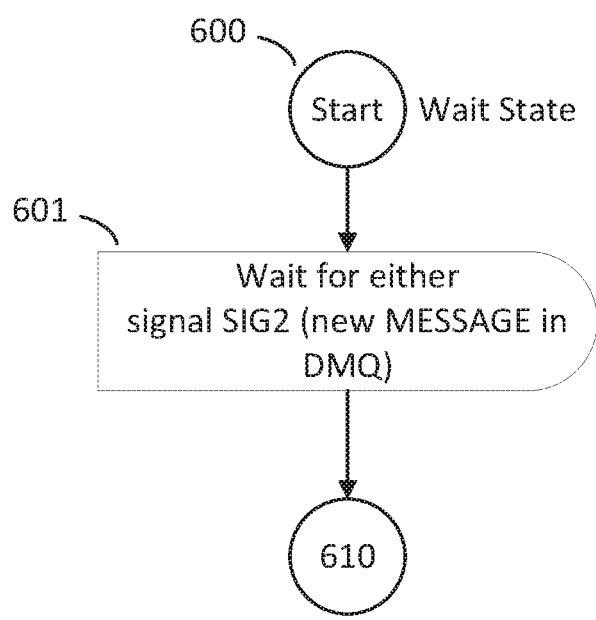
FIG. 6A through FIG. 6B are flow diagrams that illustrate how the logic used by the Delayed Message Release Process (DMRP) provide the Intended Interleaving Behavior in both Wait and Active states.
Figure 6B:
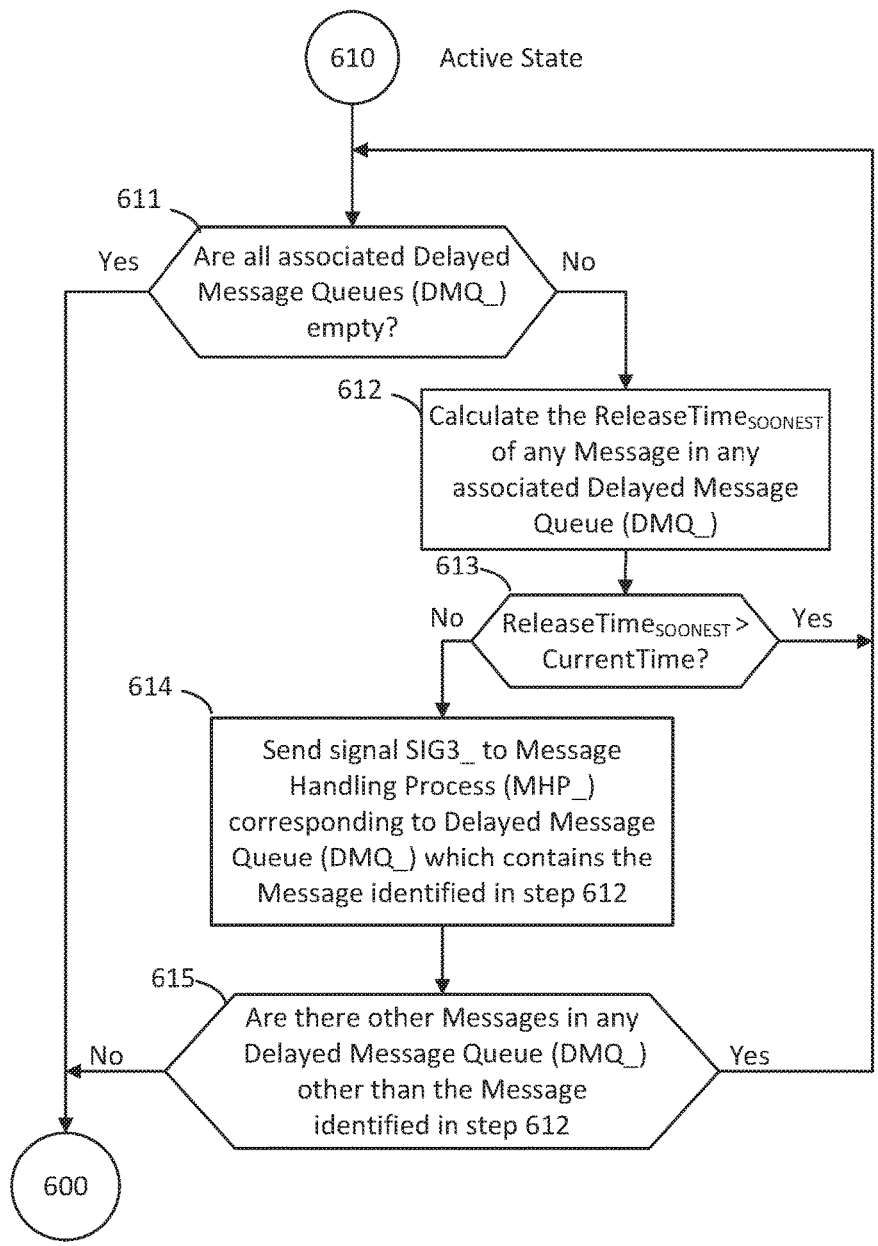

The Delayed Message Release Process (DMRP) 390 is either in a Wait State or an active state. If the Delayed Message Release Process (DMRP) 390 is in a Wait State and receives Signal SIG2a from the Message Handling Process (MHP) 311, a new Message has been placed in the Delayed Message Queue (DMQa) 312. In response, DMRP 390 enters an active state in which it monitors whether a Release Time of the top Message in DMQa 312 has been reached. The Delayed Message Release Process (DMRP) 390 is in an active state if there is any order in the Delayed Message Queue (DMQa) 312. The purpose of DMRP 390 is to send Signal SIG3a to the Message Handling Process (MHP) when the Release Time of the top Message in the DMQa 312 has been reached. After sending Signal SIG3a to DMQa 311 for the only Message remaining in DMQa 312, the DMRP 390 enters the Wait State. FIGS. 6A-B (discussed below) illustrate the logic of DMRP 390.

Figure 4:
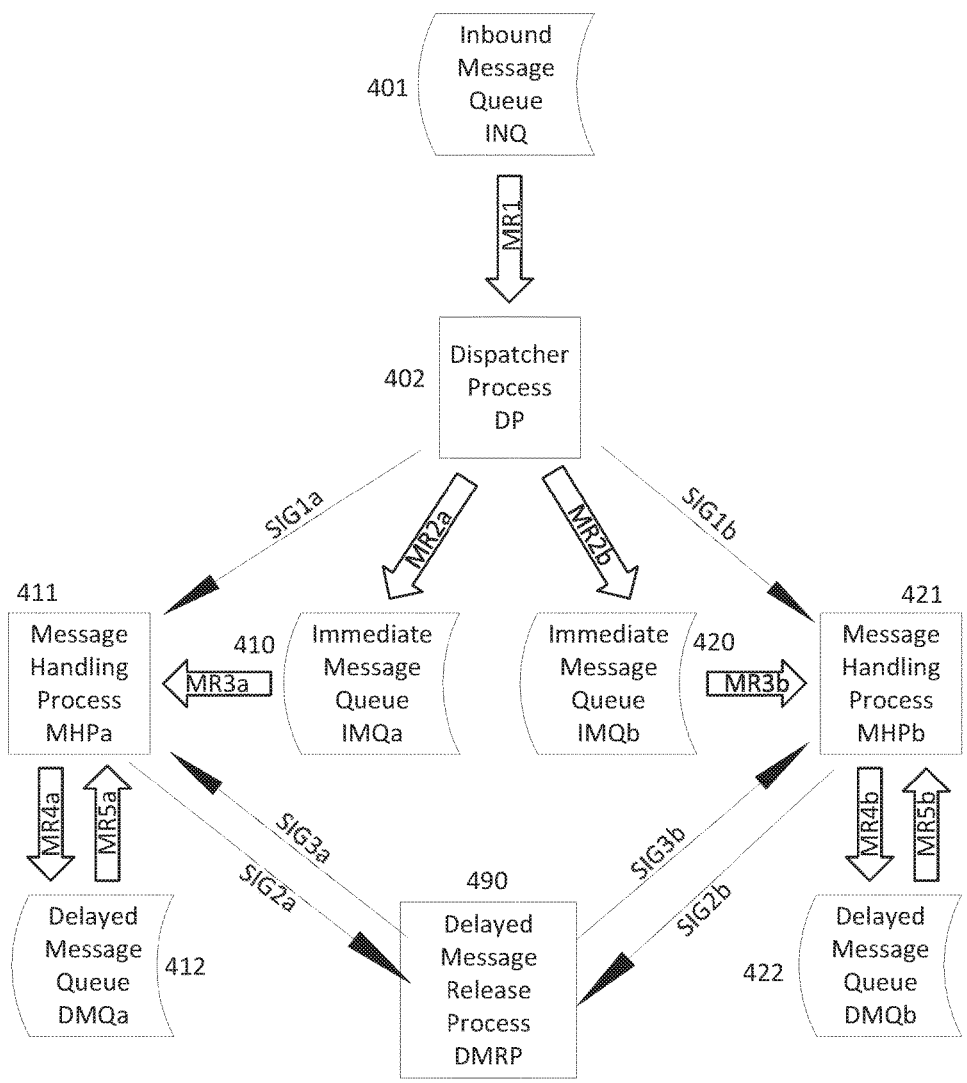
FIG. 4 is a flowchart that illustrates a novel system with a two Message Handling Process (MHPa and MHPb) like that in FIG. 2, but that has been enhanced according to an implementation of the invention which adds Delayed Message Queues (DMQa and DMQb), Message Routes (MR4a, MR5a, MR4b, MR5b), Signals (SIG2a, SIG3a, SIG2b, SIG3b), and a single Delayed Message Release Processes (DMRP) to implement the Intended Interleaving Behavior.

FIG. 4 illustrates operation of a novel Dispatcher Process (DP) 402, according to an implementation of the invention which receives Inbound Messages and sequences their arrival in the Immediate Message Queues (IMQa and IMQb) 410 and 420 for handling by the Message Handling Processes (MHPa and MHPb) 411 and 421. Because there are two Message Handling Process, this is a multi-threaded system. Additional Message Handling Processes can be added in parallel.

Messages from various sources directed to the system are queued in the Inbound Message Queue 401. Messages in the Inbound Message Queue 401 are sent using path MR1 to the Dispatcher Process (DP) 402. DP 402 may perform various preprocessing such as establishing Time of Receipt, assigning Sequence Numbers, or Message logging. DP 402 then determines which Message Handling Process (MHPa or MHPb) 411 or 421 will handle this Message. If the Message is to be handled by Message Handling Process (MHPa) 411, DP 402 places the Message into the corresponding Immediate Message Queue (IMQa) 410 using path MR2a and then sends a Signal (SIG1a) to MHPa 411. If the Message is to be handled by Message Handling Process (MHPb) 421, the DP 402 places the Message into the corresponding Immediate Message Queue (IMQb) 420 using path MR2b and then sends a Signal (SIG1b) to MHPb 421.

The decision as to which Immediate Message Queue and Message Handling Process MHP may be made based on any predefined criteria. Load balancing may be a factor. However, according to one implementation, all messages associated with a particular trading symbol may be designated to a particular IMQ/MHP if that particular IMQ/MHP already contains a message for that symbol. Any other criteria may be used for the decision as well.

The Message resides in the Immediate Message Queue (IMQa) 410 until removed by the Message Handling Process (MHPa) 411. The Message Handling Process (MHPa) 411 is either in a Wait State or actively processing a Message. If the Message Handling Process (MHPa) 411 is in a Wait State, MHPa 411 remains in a Wait State until it receives a Signal SIG1a which indicates that a Message in the Immediate Message Queue (IMQa) 410 is ready to be processed or receives SIG3a which indicates that a Message in the Delayed Message Queue (DMQa) 412 is ready to be processed. At that time, the MHPa 411 may apply the logic illustrated in FIGS. 5A-E to determine what to do next. If the Message Handling Process (MHPa) 411 is actively processing a Message, when it completes processing that Message, MHPa 411 may apply the logic illustrated in FIGS. 5A-E to determine what to do next.

The Message resides in the Immediate Message Queue (IMQb) 420 until removed by the Message Handling Process (MHPb) 421. The Message Handling Process (MHPb) 421 is either in a Wait State or actively processing a Message. If the Message Handling Process (MHPb) 421 is in a Wait State, MHPb 421 remains in a Wait State until it receives a Signal SIG1b which indicates that a Message in the Immediate Message Queue (IMQb) 420 is ready to be processed or receives SIG3b which indicates that a Message in the Delayed Message Queue (DMQb) 422 is ready to be processed. At that time, MHPb 421 may apply the logic illustrated in FIGS. 5A-E to determine what to do next. If the Message Handling Process (MHPb) 421 is actively processing a Message, when it completes processing that Message, MHPb 421 may apply the logic illustrated in FIGS. 5A-E to determine what to do next.

The Delayed Message Release Process (DMRP) 490 is either in a Wait State or an active state. If the Delayed Message Release Process (DMRP) 490 is in a Wait State, the Delayed Message Release Process (DMRP) 490 remains in a Wait State until it receives either Signal SIG2a from the Message Handling Process (MHPa) 411 or Signal SIG2b from the Message Handling Process (MHPb) 421. Signal SIG2a indicates that Message Handling Process (MHPa) 411 has placed a new Message in the Delayed Message Queue (DMQa) 412. Signal SIG2b indicates that MHPb 421 has placed a new Message in the Delayed Message Queue (DMQb) 422. In response, the Delayed Message Release Process (DMRP) 490 enters an active state in which it monitors whether either the Release Time of the top Message in DMQa 412 or the Release Time of the top Message in DMQb 422 has been reached. If the former occurs, Signal SIG2a is sent to MHPa 411. If the latter occurs, Signal SIG2b is sent to MHPb 421. When the Release Time of all Messages in both DMQa 412 and DMQb 422 has been signaled to MHPa 411 and MHPb 412, respectively, DMRP 490 enters a Wait State.

The Delayed Message Release Process (DMRP) 490 is in an active state if there is a Message in either the Delayed Message Queue (DMQa) 412 or the Delayed Message Queue (DMQb) 422. The purpose of DMRP 490 is to send Signal SIG3a or SIG3b to Message Handling Process (MHPa) 311 or Message Handling Process (MHPb) 321, respectively, when the Release Time of the top Message in the corresponding DMQa or DMQb has been reached. After sending Signal SIG3a or SIG3b to the corresponding MHPa or MHPb, if all Messages in every DMQa and DMQb have been signaled to the corresponding MHPa or MHPb, DMRP 490 enters the Wait State. FIGS. 5A-5E illustrate the logic of the Delayed Message Release Process.

FIG. 5A through FIG. 5E illustrate how the logic used by the Message Handling Process (MHP) provide the Intended Interleaving Behavior, according to one or more implementations.

Figure 5A:
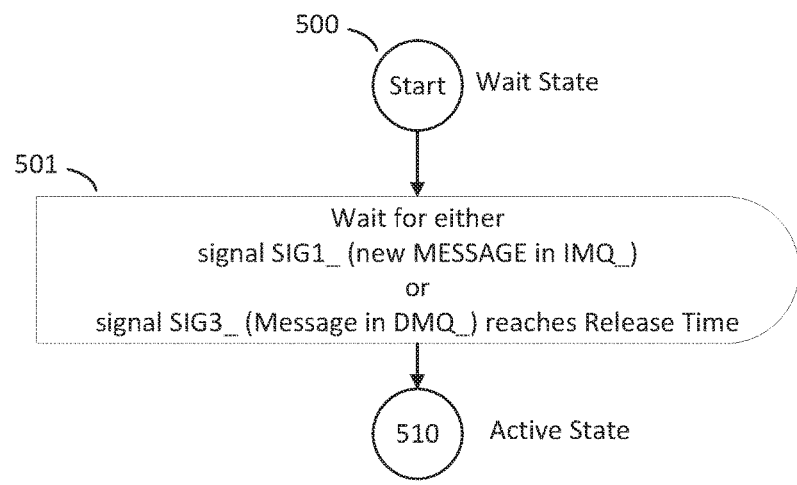
FIGS. 5A through 5E are flow diagrams that illustrate how the logic used by the Message Handling Process (MHP) provides the Intended Interleaving Behavior in both Wait and Active states.

FIG. 5A is a flowchart that illustrates the logic of a Message Handling Process (MHP_) 500 in the Wait State, according to an implementation. This Message Handling Process 500 may be an example of Message Handling Processes 311, 411, and 421 described above.

The Message Handling Process (MHP_) 500 begins in the Wait State. In this state, the corresponding Immediate Message Queue (IMQ_) (for example, 310, 410, and 420 described above) and corresponding Delayed Message Queue (DMQ) (for example, 312, 412, and 422 described above) are both empty.

At operation 501, there being no Messages in either the corresponding Immediate Message Queue (IMQ_) or corresponding Delayed Message Queue (DMQ_), the Message Handling Process (MHP_) waits at 501 until it receives either Signal SIG1_from the Dispatch Process (DP) (for example, 302 and 402 described above) indicating that a new Message has been placed in the corresponding Immediate Message Queue (IMQ_) or Signal SIG3_ from the corresponding MHP_ indicating that a new Message has been placed in the corresponding DMQ_). When either Signal is received, the MHP_ leaves the Wait State and enters the active state at 510 (FIG. 5B).

Figure 5B:
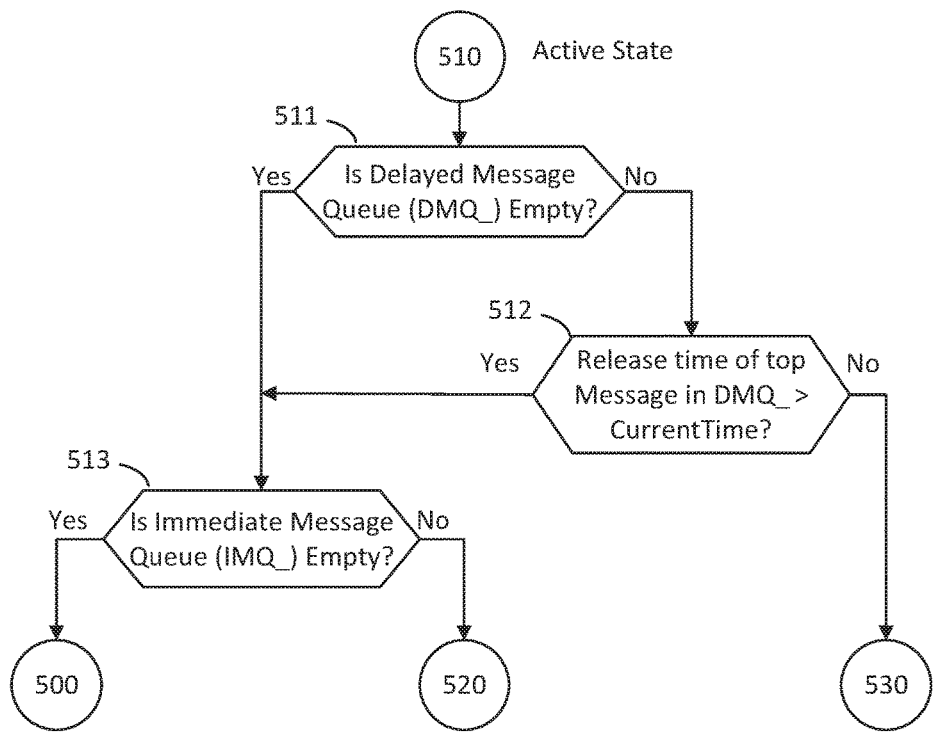

FIG. 5B is a flowchart illustrates the logic of a Message Handling Process (MHP_) in the active state, according to an implementation, when it determines which, if any, Message in the corresponding Immediate Message Queue (IMQ_) or corresponding Delayed Message Queue (DMQ_) to examine.

At operation 510, the Message Handling Process (MHP_) enters the active state. Processing continues at operation 511. At operation 511, the Message Handling Process (MHP_) examines the corresponding Delayed Message Queue (DMQ_) to determine whether it is empty. If the corresponding Delayed Message Queue (DMQ_) is empty, processing continues at operation 513. Otherwise processing continues at operation 512.

At operation 512, the Message Handling Process (MHP_) compares the Release Time of the top Message in the corresponding Delayed Message Queue (DMQ_) with the CurrentTime. If the ReleaseTime is greater than CurrentTime (512:Yes), then the top Message in DMQ_ is not eligible to be released from DMQ_, and therefore, no Message is eligible to be released from DMQ_—processing continues at operation 513. Otherwise (512:No), the top Message DMQ_ is eligible to be released from DMQ_ and is the first Message eligible to be released from DMQ_, and processing continues at operation 530.

At operation 513, the Message Handling Process (MHP_) has determined that there are no Messages in the corresponding Delayed Message Queue (DMQ_) which are eligible to be released at the CurrentTime. Now, the Message Handling Process (MHP_) determines whether the corresponding Immediate Message Queue (IMQ_) is empty. If the IMQ_ is empty (513:Yes), then there are no Messages in either the corresponding IMQ_ or DMQ_ which can be processed immediately, and the MHP_ enters the Wait State at 500. Otherwise (513:No), there is a Message in IMQ_ but no Message in DMQ_ which may be processed at this time, and processing continues at 520 (FIG. 5C).

Figure 5C:
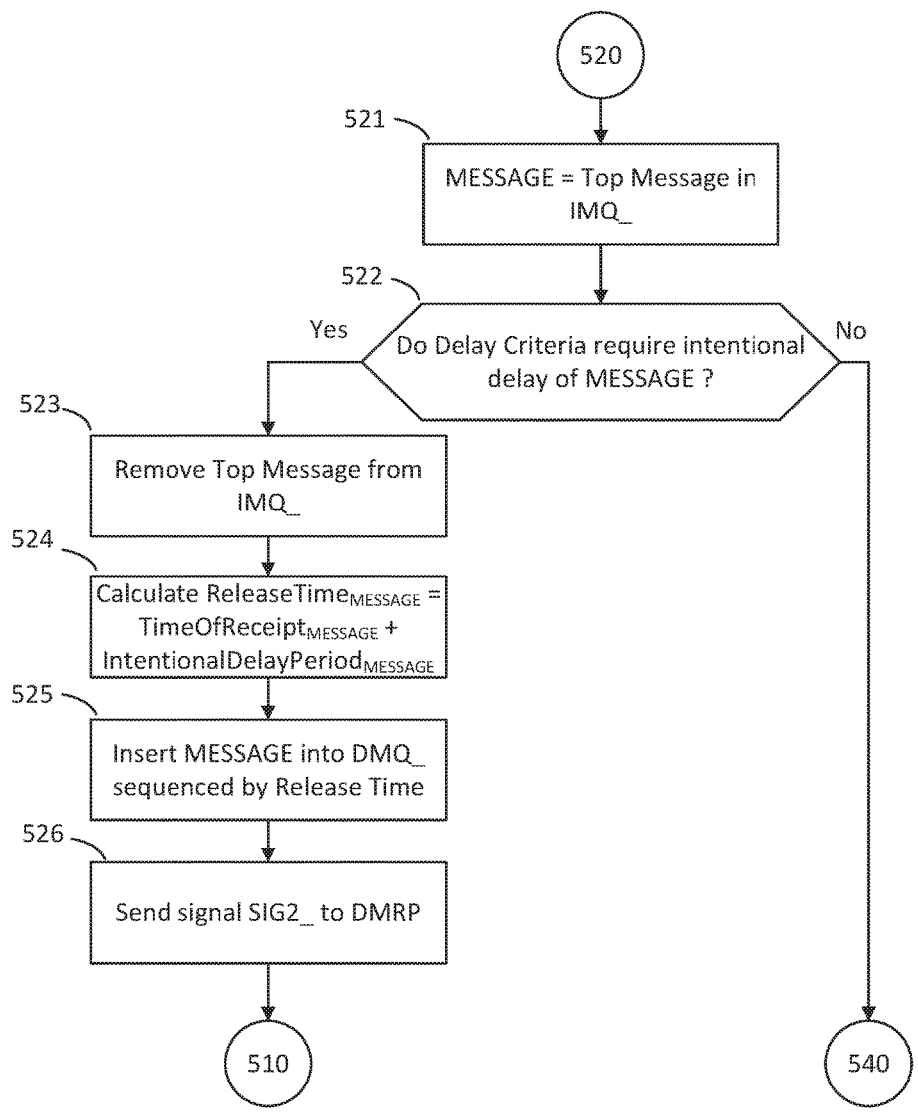

FIG. 5C is a flowchart that illustrates the logic of a Message Handling Process (MHP_) in the active state, according to an implementation, when it has determined that there is a Message in the corresponding Immediate Message Queue (IMQ_) and no Message in the corresponding Delayed Message Queue (DMQ_) which is eligible for immediate processing.

At operation 520, the Message Handling Process (MHP_) is in the active state and has determined that there is a Message in the corresponding Immediate Message Queue (IMQ_) and no Message in the corresponding Delayed Message Queue (DMQ_) which is eligible for immediate processing. Processing continues at operation 521.

At operation 521, the Message Handling Process (MHP_) sets the MESSAGE being examined to be the top Message in the Immediate Message Queue (IMQ_). Processing continues at operation 522.

At operation 522, the Message Handling Process (MHP_) applies the Delay Criteria to the MESSAGE and determines whether this MESSAGE is to be intentionally delayed. If this MESSAGE is to be intentionally delayed (522:Yes), processing continues at operation 523. Otherwise (522:No) processing continues at operation 540.

At operation 523, the Message Handling Process (MHP_) has determined that the MESSAGE is to be intentionally delayed. MHP_ removes the MESSAGE from the Immediate Message Queue (IMQ_), and processing continues at operation 524.

At operation 524, the Message Handling Process (MHP_) calculates aReleaseTime$_{MESSAGE}$ as the sum of the TimeOfReceipt$_{MESSAGE}$ and the IntentionalDelayPeriod$_{MESSAGE}$. The MESSAGE is modified to include its Release Time as the ReleaseTime$_{MESSAGE}$, and processing continues at operation 525.

At operation 525, the Message Handling Process (MHP_) inserts the MESSAGE into the corresponding Delayed Message Queue (DMQ_) based on the ReleaseTime$_{MESSAGE}$. DMQ_ will preferably have the Message with the soonest Release Time at the top and the sequence of Messages within that queue will be in ascending order based on the Release Time of each Message in the queue, although other orderings and information tags producing this result are possible as well. Processing continues at operation 526.

At operation 526, the Message Handling Process (MHP_) sends Signal SIG3_ to the Delayed Message Release Process (DMRP). This Signal informs DMRP that a new Message with a Release Time of ReleaseTime$_{MESSAGE}$ has been added to the corresponding DMQ_. The logic within DMRP is illustrated in FIGS. 6A-6B. The MESSAGE has now been intentionally delayed, and processing continues at operation 510.

Figure 5D:
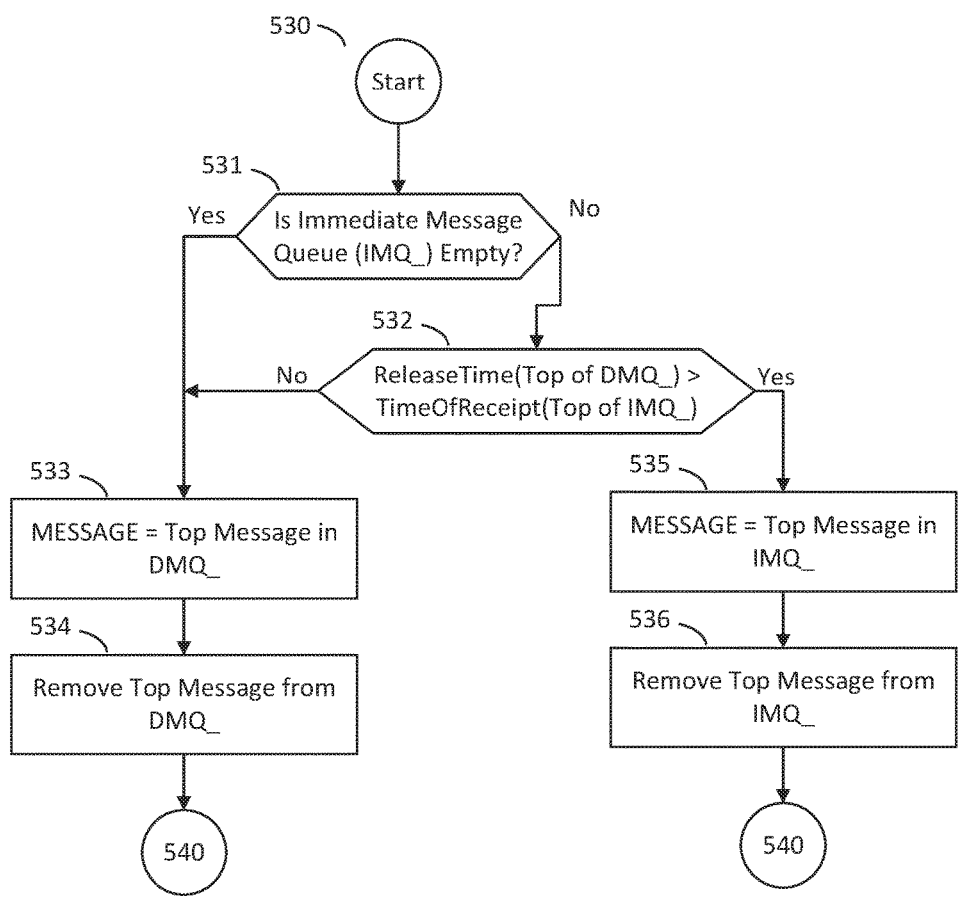

FIG. 5D is a flowchart that illustrates the logic of a Message Handling Process (MHP_) in the active state, according to an implementation, when it has determined that the top Message in the corresponding Delayed Message Queue (DMQ_) is eligible for immediate processing.

At operation 530, the Message Handling Process (MHP_) is in the active state, and it has determined that the top Message in the corresponding Delayed Message Queue (DMQ_) is eligible for immediate processing. Processing continues at operation 531.

At operation 531, the Message Handling Process (MHP_) determines whether the corresponding Immediate Message Queue (IMQ_) is empty. If IMQ_ is empty (531:Yes), the top Message in the Delayed Message Queue (DMQ_) should be processed immediately, and processing continues at 533. Otherwise (531:No), the top Message in IMQ_ and the top Message in DMQ_ are both eligible to be processed immediately, and processing continues at operation 532.

At operation 532, the Message Handling Process (MHP_) compares the Release Time of top Message in the Delayed Message Queue (DMQ_) with the Time of Receipt of the top Message in the corresponding Immediate Message Queue (IMQ_) to determine which should be processed first. If the Release Time of the top Message in DMQ_ is greater than the Time of Receipt of the top Message in IMQ_ (532:Yes), then the top Message in IMQ_ should be processed first, and processing continues at operation 535. Otherwise (532:No), processing continues at operation 533.

At operation 533, the Message Handling Process (MHP_) has determined that the top Message in the Delayed Message Queue (DMQ_) should be processed first. MHP_ sets MESSAGE to be the top Message in DMQ_, and processing continues at operation 536.

Figure 5E:
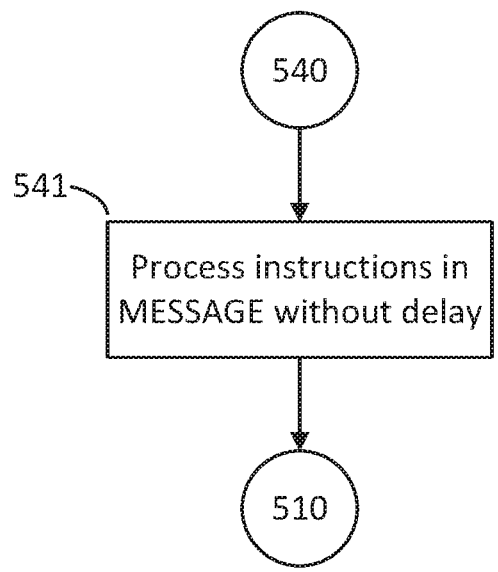

At operation 534, the Message Handling Process (MHP_) removes the top Message in the Delayed Message Queue (DMQ_) from that queue and processing continues at operation 540 (FIG. 5E).

At operation 535, the Message Handling Process (MHP_) has determined that the top Message in the Immediate Message Queue (IMQ_) should be processed immediately. MHP_ sets MESSAGE to be the top Message in IMQ_, and processing continues at operation 536.

At operation 536, the Message Handling Process (MHP_) removes the top Message in the Immediate Message Queue (IMQ_) from that queue and processing continues at 540 (FIG. 5E).

FIG. 5E is a flowchart that illustrates how the Message Handling Process (MHP) completes, according to an implementation, the immediate processing of a Message and then determines what to do next.

At operation 540, the MESSAGE has been set to the next Message to be immediately, processed by the Message Handling Process (MHP_). At this point, no intentional delay of the current MESSAGE is allowed.

At operation 541, the Message Handling Process (MHP_) processes the MESSAGE without delay applying known processing appropriate for the instructions contained within the MESSAGE. When processing of the MESSAGE is complete, processing continues at 510 where the Message Handling Process (MHP_) either determines that another Message is ready to be processed (remaining in the active state) or determines that there is no Message ready to be processed (returning to the Wait State).

The operations described in FIGS. 5A-5E may be extended to any number of message handling processes MHP, immediate message queues IMQ, and delayed message queues DMQ consistent with the description above.

FIG. 6A through FIG. 6B are flowcharts that illustrate how the logic is used by the Delayed Message Release Process (DMRP) to provide the Intended interleaving Behavior, according to an implementation.

FIG. 6A is a flowchart that illustrates the logic of the Delayed Message Release Process (DMRP) 600 in the Wait State, according to an implementation.

The Delayed Message Release Process (DMRP) 600 begins in the Wait State. In this state, all Delayed Message Queues (DMQ_) associated with this Delayed Message Release Process (DMRP) are empty.

At operation 601, there being no Messages in any corresponding Delayed Message Queue (DMQ), the Delayed Message Release Process (DMRP) waits at operation 601 until it receives Signal SIG2_ from any corresponding Message Handling Process (MHP_) indicating that a new Message has been placed in the one of the corresponding Delayed Message Queues (DMQ_). When Signal SIG2_ is received, the Delayed Message Release Process (DMRP) leaves the Wait State and enters the active state at 610 (FIG. 6B).

FIG. 6B is a flowchart that illustrates the logic of the Delayed Message Release Process (DMRP) in the active state, according to an implementation.

At operation 610, the Delayed Message Release Process (DMRP) enter the active state. Processing continues at operation 611.

At operation 611, the Delayed Message Release Process (DMRP) determines whether all associated Delayed Message Queues (DMQ_) are empty. If all are empty (611:Yes), there is no reason for DMRP to remain in the active state, and DMRP processing continues at operation 600 where DMRP enters the Wait State. Otherwise (611:No), processing continues at operation 612.

At operation 612, the Delayed Message Release Process (DMRP) calculates ReleaseTime$_{SOONEST}$ as the soonest Release Time of any Message in any associated Delayed Message Queue (DMQ_) by examining the top Message in each associated DMQ_, if any, to determine that Message's release time. If the top Message in two or more DMQ_ have the same Release Time, then the Message among those which has the smallest Sequence Number is chosen as the first DMQ_ Message which is eligible to be released. DMRP also identifies which DMQ_ contains this Message. Processing continues at operation 613.

At operation 613, the Delayed Message Release Process (DMRP) compares ReleaseTime$_{SOONEST}$ with the CurrentTime to determine whether it is time to release the Message identified in operation 612. If ReleaseTime$_{SOONEST}$ is greater than CurrentTime (613:Yes), then it is not yet time to release that Message, and processing continues at operation 611. This is preferably executed in a "tight loop" so that the identified Message is released as soon as possible. When the Delayed Message Release Process (DMRP) has determined that it is time to immediately release the Message identified in operation 612 (613:No), processing continues at operation 614.

At operation 614, to release that Message, the Delayed Message Release Process (DMRP) sends Signal SIG3_ to the Message Handling Process (MHP_) corresponding to Delayed Message Queue (DMQ_) which contains the Message to be released. Processing continues at operation 615.

At operation 615, the Message Release Process (DMRP) determines whether there are any other Messages which remain in any Delayed Message Queue (DMQ_) other than the Message whose release has just been signaled. If so (615:Yes), the Message Release Process (DMRP) remains in the active state, and processing continues at operation 611. Otherwise (615:No), there will be no remaining Messages in the Message Release Process (DMRP) after the Message identified in operation 612 is removed, and the Message Release Process (DMRP) enters the Wait State with processing continuing at operation 600.

In one implementation, at operation 615, as long as there are other messages in any Delayed Message Queue (DMQ_), the processing may continue at operation 611 in a tight loop. This tight loop implementation may provide excellent responsiveness in that it may rapidly process any intentionally delayed message that is ripe to be removed from the Delayed Message Queue (DMQ_). Such a process may be executed on a devoted core of a multi-core processor, for example.

The system or systems described herein may be implemented on any form of computer or computers and the components may be implemented as dedicated applications or in client-server architectures, including a web-based architecture, and can include functional programs, codes, and code segments. Any of the processes described above may be executed on a computer as described herein. Any of the computers, as discussed herein, may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (RUM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

Figure 7:
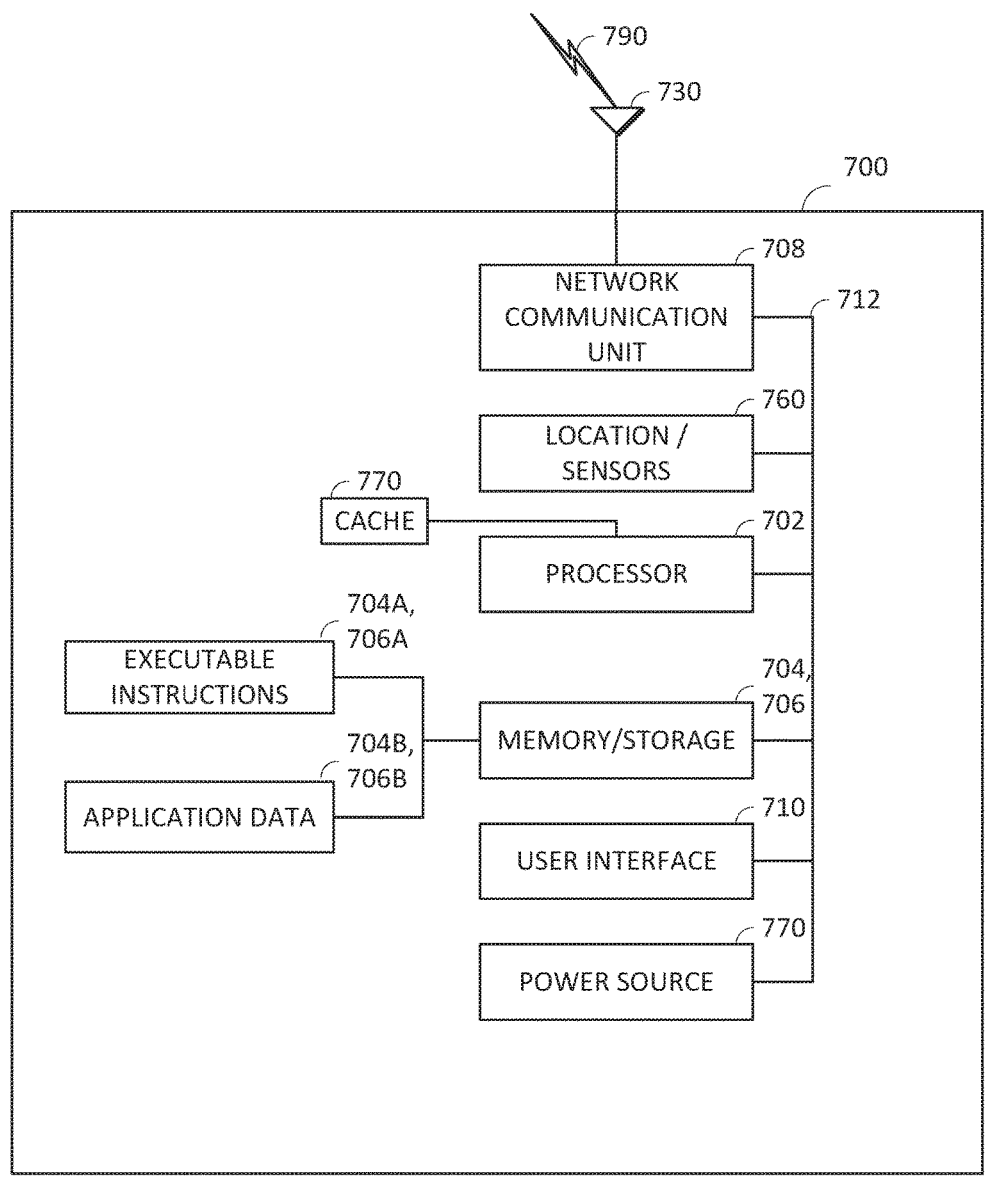
FIG. 7 is a block diagram of an implementation of an internal configuration of a computing device, including an infrastructure control server of a computing system.

In more detail, FIG. 7 is a block diagram of an implementation of an internal configuration of a computing device 700, including an infrastructure control server of a computing system. The computer components utilized to execute the functions herein may take the form of a computing system including multiple computing units, or in the form of a single computing unit, for example, a mobile phone, a tablet computer, a laptop computer, a notebook computer, a desktop computer, a server computer and the like.

The computing device 700 can include a number of components, as illustrated in FIG. 7. The processor 702 can be a central processing unit, such as a microprocessor, and can include single or multiple processors, each having single or multiple processing cores. Alternatively, the processor 702 can include another type of device, or multiple devices, capable of manipulating or processing information now-existing or hereafter developed. When multiple processing devices are present, they may be interconnected in any manner, including hardwired or networked, including wirelessly networked. Thus, the operations of processor 702 can be distributed across multiple machines that can be coupled directly or across a local area or other network. The processor 702 can be a general purpose processor or a special purpose processor, and any general purpose processor may be considered a special purpose processor when coupled with algorithms containing code designed to execute on the processor.

Random Access Memory (RAM) 704 can be any suitable non-permanent storage device that is used as memory. RAM 704 can include executable instructions and data for access by processor 702. RAM 704 typically comprises one or more DRAM modules such as DDR SDRAM. Alternatively, RAM 704 can include another type of device, or multiple devices, capable of storing data for processing by processor 702 now-existing or hereafter developed. The processor 702 can access and manipulate data in RAM 704 via bus 712. The processor 702 may utilize a cache 770 as a form of localized fast memory for operating on data and instructions.

Storage 706 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 706 can include executable instructions 706A and application files/data 706B along with other data. The executable instructions 706A can include, for example, an operating system and one or more application programs for loading in whole or part into RAM 704 (with RAM-based executable instructions 704A and application files/data 704B) and to be executed by processor 702. The executable instructions 706A may be organized into programmable modules or algorithms, functional programs, codes, and code segments designed to perform various functions described herein. The operating system can be, for example, a Microsoft Windows®, Mac OS X®, or Linux® operating system, or can be an operating system for a small device, such as a smart phone or tablet device, or a large device, such as a mainframe computer. The application program can include, for example, a web browser, web server and/or database server. Application files 706B can, for example, include user files, database catalogs and configuration information. In an implementation, storage 706 includes instructions to perform the discovery techniques described herein. Storage 706 may comprise one or multiple devices and may utilize one or more types of storage, such as solid state or magnetic.

The computing device 700 can also include one or more input/output devices, such as a network communication unit 708 and interface 730 that may have a wired communication component or a wireless communications component 790, which can be coupled to processor 702 via bus 712. The network communication unit 708 can utilize any of a variety of standardized network protocols, such as Ethernet, TCP/IP, or the like to effect communications between devices. The interface 730 can comprise one or more transceiver(s) that utilize the Ethernet, power line communication (PLC), WiFi, infrared, GPRS/GSM, CDMA, etc.

A user interface 710 can include a display, positional input device (such as a mouse, touchpad, touchscreen, or the like), keyboard, or other forms of user input and output devices. The user interface 710 can be coupled to the processor 702 via the bus 712. Other output devices that permit a user to program or otherwise use the client or server can be provided in addition to or as an alternative to display 710. When the output device is or includes a display, the display can be implemented in various ways, including by a liquid crystal display (LCD) or a cathode-ray tube (CRT) or light emitting diode (LED) display, such as an OLED display.

Other implementations of the internal configuration or architecture of clients and servers 700 are also possible. For example, servers may omit display 710. RAM 704 or storage 706 can be distributed across multiple machines such as network-based memory or memory in multiple machines performing the operations of clients or servers. Although depicted here as a single bus, bus 712 can be composed of multiple buses, that may be connected to each other through various bridges, controllers, and/or adapters. Computing devices 700 may contain any number of sensors and detectors that monitor the computing device 700 itself or the environment around the computing device 700, or it may contain a location identification unit 760, such as a GPS or other type of location device. The computing device 700 may also contain a power source 770, such as a battery, so that the unit can operate in a self-contained manner. These may communicate with the processor 702 via the bus 712.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The embodiments herein may be described in terms of functional block components and various processing steps. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, Signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Expressions such as "at least one of," when preceding a list of elements, modify the entire list of elements and do not modify the individual elements of the list.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A method for interleaving undelayed and intentionally delayed executable instructions in a system comprising one or more servers, a message input, a memory storing programmed instructions, and a processor, the method comprising:
   executing the programmed instructions by the processor, said programmed instructions defining an inbound message queue (INQ), a message handling process (MHPa), an immediate message queue (IMQa), a delayed message queue (DMQa) and a dispatcher process (DP);
   receiving, via the message input, a current message at a time of receipt and directing the current message to the INQ;
   dispatching, using the dispatcher process (DP), the current message from the INQ to the IMQa;
   activating, by the DP, the MHPa by sending a triggering signal (SIG1a or SIG3a) to the MHPa, said triggering signal causing the MHPa to switch from a wait state to an active state and indicating a presence of the current message in the IMQa; and
   in response to the MHPa being triggered to the active state, performing, by the MHPa:
      determining that the DMQa is empty;
      determining that the IMQa is empty;
      determining if delay criteria of the current message requires an intentional delay of the current message; and
      when the delay criteria do not require an intentional delay, setting the current message to be a next message to be immediately processed by the MHPa.

2. The method of claim 1, further comprising:
   when the delay criteria require an intentional delay, then:
      calculating a release time of the current message that is based on the time of receipt of the current message and an intentional delay period for the current message, and associating the release time with the current message;
      transferring the current message into the DMQa sequenced by its release time; and
      sending a second signal (SIG2a) to a delayed message release process (DMRP).

3. The method of claim 1, further comprising:
   setting the MHPa back to the wait state.

4. The method of claim 1, further comprising:
   determining that the DMQa comprises at least one message;
   determining that a release time of the at least one message in the DMQa is greater than a current time; and
   determining whether the IMQa is empty.

5. The method of claim 4, further comprising:
   determining that the release time is less than the current time; and
   executing a message selection process.

6. The method of claim 5, wherein the message selection process comprises:
   determining that the IMQa is empty;
   transferring the at least one message to the IMQa and setting the at least one message as next to be immediately processed; and
   transferring the current message to the IMQa and setting the current message to be immediately processed after the at least one message.

7. The method of claim 5, wherein the message selection process comprises:
   determining that the IMQa is not empty;
   determining that a release time of the at least one message in the DMQa is less than a receipt time of at least one existing message in the IMQa;
   transferring the at least one message from the DMQa to the IMQa and setting the at least one message to be processed ahead of the at least one existing message; and
   transferring the current message to the IMQa and setting the current message to be immediately processed after both the at least one message and the at least one existing message.

8. The method of claim 5, wherein the message selection process comprises:
   determining that the IMQa is not empty;
   determining that a release time of the at least one message in the DMQa is greater than a receipt time of at least one existing message in the IMQa; and
   transferring the current message to the IMQa and setting the current message to be immediately processed after the at least one existing message in the IMQa.

9. The method of claim 1, wherein the INQ is a first-in-first-out (FIFO) queue in the memory.

10. The method of claim 1, further comprising:
    activating, by the DP, a delayed message release process (DMRP) by sending a DMRP triggering signal (SIG2a) to the DMRP, said DMRP triggering signal causing the DMRP to switch from a wait state to an active state and indicating a presence of at least one message in the DMRP;
calculating a soonest release time of any message in the DMQa; and
when the soonest release time is less than the current time, returning to the determining if the DMQa is empty operation; and
setting the DMRP back to the wait state when the DMQa is empty.

11. The method of claim 10, wherein when the soonest release time is greater than the current time, the method further comprises:
receiving, by the MHPa, a DMRP triggering signal (SIG3a) from the DMRP, the triggering signal (SIG3a) indicating a presence of a soonest release time message in the DMQa;
transferring the soonest release time message from the DMQa to the IMQa and setting the soonest release time message to be processed;
determining that there are no further messages in the DMQa; and
setting the DMRP back to the wait state.

12. The method of claim 1, wherein:
the message handling process (MHPa) is a first message handling process;
the triggering signal (SIG1a or SIG3a) is a first triggering signal;
the delayed message queue (DMQa) is a first delayed message queue;
the immediate message queue (IMQa) is a first immediate message queue; and
the current message is a first current message (MR2a);
the method further comprising:
receiving via the message input, a second current message at a second time of receipt and directing the second current message to the INQ;
dispatching, using the DP, the second current message from the INQ to a second immediate message queue (IMQb);
activating, by the DP, a second message handling process (MHPb) by sending a second triggering signal (SIG1b or SIG3b) to the second MHPb, said second triggering signal causing the second MHPb to switch from a wait state to an active state and indicating a presence of the second current message in the second IMQb;
in response to the second MHPb being triggered to the active state, performing, by the MHPb:
determining that a second delayed message queue (DMQb) is empty;
determining that the second IMQb is empty
determining if delay criteria of the second current message requires an intentional delay of the second current message;
when the delay criteria do not require an intentional delay, setting the second current message to be a second next message to be immediately processed by the second MHPb.

13. The method of claim 12, further comprising:
when the delay criteria require an intentional delay, then:
calculating a second release time of the second current message that is based on the time of receipt of the second current message and an intentional delay period for the second current message, and associating the second release time with the second current message;
transferring the second current message into the second DMQb sequenced by its release time; and
sending a second-second signal (SIG2b) to the DMRP.

14. The method of claim 12, further comprising:
setting the second MHPb back to the wait state.

15. The method of claim 12, further comprising:
determining that the second DMQb comprises at least one second message;
determining that a second release time of the at least one second message in the second DMQb is greater than a current time; and
the determining whether the second IMQb is empty.

16. The method of claim 15, further comprising:
determining that the second release time is less than the current time; and
executing a second message selection process.

17. The method of claim 16, wherein the second message selection process comprises:
determining that the second IMQb is empty;
transferring the at least one second message to the second IMQb and setting the at least one second message as next to be immediately processed; and
transferring the second current message to the first IMQa and setting the second current message to be immediately processed after the at least one second message.

18. The method of claim 16, wherein the second message selection process comprises:
determining that the second IMQb is not empty;
determining that a second release time of the at least one second message in the second DMQb is less than a receipt time of at least one existing second message in the second IMQb;
transferring the at least one message from the second DMQb to the second IMQb and setting the at least one second message to be processed ahead of the at least one existing second message; and
transferring the second current message to the first IMQa and setting the second current message to be immediately processed after both the at least one second message and the at least one existing second message.

19. The method of claim 16, wherein the message selection process comprises:
determining that the second IMQb is not empty;
determining that a second release time of the at least one second message in the second DMQb is greater than a second receipt time of at least one existing second message in the second IMQb; and
transferring the second current message to the second IMQb and setting the second current message to be immediately processed after the at least one existing second message in the second IMQb.

20. The method of claim 12, further comprising:
activating, by the DP, a delayed message release process (DMRP) by sending either a first DMRP triggering signal (SIG2a) or a second DMRP triggering signal (SIG2b) to the DMRP, said first DMRP triggering signal (SIG2a) or said second DMRP triggering signal (SIG2b) causing the DMRP to switch from a wait state to an active state and indicating a presence of at least one second message in the DMRP;
calculating a soonest release time of any message in either of the first DMQa or second DMQb;
when the soonest release time of a soonest release time message is less than the current time, returning to the determining if the first DMQa and the second DMQb are empty operation;

determining that the first DMQa and the second DMQb are empty; and setting the DMRP back to the wait state.

21. The method of claim 20, wherein when the soonest release time is greater than the current time, the method further comprises:

when the DMQa contains the soonest release time message:

receiving, by the MHPa, a first DMRP triggering signal (SIG3*a*) from the DMRP, the first DMRP triggering signal (SIG3*a*) indicating a presence of the soonest release time message in the first DMQa;

when the second DMQb contains the soonest release time message:

receiving, by the MHPb, a second DMRP triggering signal (SIG3*b*) from the DMRP, the second DMRP triggering signal (SIG3*b*) indicating a presence of the soonest release time message in the second DMQb;

determining that there are no further message in the first DMQa or the second DMQb other than the soonest release time message; and setting the DMRP to a wait state.

22. A system for interleaving undelayed and intentionally delayed executable instructions, comprising:

a processor; and a memory having programmed instructions stored thereon, said programmed instructions, when executed by the processor, defining an inbound message queue (INQ), a message handling process (MHPa), an immediate message queue (IMQa), a delayed message queue (DMQa), and a dispatcher process (DP), the programmed instructions, when executed, further causing the system to:

receive, via the message input, a current message at a time of receipt and direct the current message to the INQ;

dispatch, by the dispatcher process (DP), the current message from the INQ to the IMQa;

activate, by the DP, the MHPa by sending a triggering signal (SIG1*a* or SIG3*a*) to the MHPa, said triggering signal causing the MHPa to switch from a wait state to an active state and indicating a presence of the current message in the IMQa; and determine that the DMQa is empty;

determine that the IMQa is empty;

determine if delay criteria of the current message requires an intentional delay of the current message; and when the delay criteria do not require an intentional delay, set the current message to be a next message to be immediately processed by the MHPa.

23. The method of claim 10, wherein when the soonest release time is greater than the current time, the method further comprises:

receiving, by the MHPa, a DMRP triggering signal (SIG3*a*) from the DMRP, the DMRP triggering signal (SIG3*a*) indicating a presence of a soonest release time message in the DMQa; and returning to the determining if the DMQa is empty operation in a tight loop when there are other messages in any DMQ.

\* \* \* \* \*